(12) United States Patent
de Beus et al.

(10) Patent No.: US 7,710,590 B2
(45) Date of Patent: May 4, 2010

(54) AUTOMATIC MAINTENANCE OF PAGE ATTRIBUTE INFORMATION IN A WORKFLOW SYSTEM

(75) Inventors: Eric de Beus, Redondo Beach, CA (US); Steve L. Ramos, Seal Beach, CA (US)

(73) Assignee: Xerox Corporation, Norwalk, VT (US)

( * ) Notice: Subject to any disclaimer, the term of this patent is extended or adjusted under 35 U.S.C. 154(b) by 890 days.

(21) Appl. No.: 11/527,934

(22) Filed: Sep. 26, 2006

(65) Prior Publication Data

US 2008/0079973 A1 Apr. 3, 2008

(51) Int. Cl.
*G06F 15/00* (2006.01)
*G06F 17/00* (2006.01)

(52) U.S. Cl. .................................... 358/1.15; 715/209

(58) Field of Classification Search ................ 359/1.15, 359/1.14, 1.13, 1.12, 1.16, 1.18; 399/81, 399/82, 83, 85; 709/201, 226, 229; 40/61, 40/63; 715/209, 222, 226, 839, 772; 358/1.15, 358/1.19, 1.13, 1.14, 1.16, 1.18
See application file for complete search history.

(56) References Cited

U.S. PATENT DOCUMENTS

| 6,173,295 | B1 | 1/2001 | Goertz et al. |
| 6,271,926 | B1 | 8/2001 | Jacobs |
| 6,965,445 | B2 | 11/2005 | Dimperio et al. |
| 6,975,820 | B2 | 12/2005 | Wong |
| 2002/0080400 | A1* | 6/2002 | Hube et al. ......... 358/1.15 |

OTHER PUBLICATIONS http://www.adobe.com/products/jdf, Aug. 28, 2006.
http://www.artspdf.com/arts_pdf_crackerjack.asp, Jul. 25, 2006.

* cited by examiner

*Primary Examiner*—Saeid Ebrahimi Dehkordy
(74) *Attorney, Agent, or Firm*—Fay Sharpe LLP

(57) ABSTRACT

A method for generating a print job ticket includes extracting page attribute information from an electronic document, embedding the page attribute information as an object within the document, processing the document to form a print job, automatically reading the object embedded in the processed document to retrieve embedded page attribute information, and generating a job ticket for the print job based on the retrieved embedded page attribute information.

18 Claims, 3 Drawing Sheets

AUTOMATIC MAINTENANCE OF PAGE ATTRIBUTE INFORMATION IN A WORKFLOW SYSTEM

BACKGROUND

The exemplary embodiment relates to the image processing arts. It finds particular application in connection with a workflow system for processing multi-page documents ready for printing which retains the formatting instructions associated with individual pages during the preparation of a print-ready file.

A print job typically includes one or more electronically-stored files and the page attributes for those files. Conventionally, a job ticket is used to direct an output device to render the document. For example, the job ticket is used to provide instructions for an imaging system, such as a printer or copier, for rendering the print job in a designated format, such as, for example, letter size or A4, as well as specifying other page attributes, such as simplex (single-sided) or duplex (double-sided) printing, and so forth. Generally, software installed on the user's computer that displays a graphical user interface (GUI) is used to select page attributes for a print job. Using a mouse, keyboard, etc., the user selects from a menu of options displayed in the GUI the appropriate page attributes or adopts a default set. The user's computer, under control of the installed software, then creates an electronically-stored job ticket based on the information entered by the user. The job ticket, along with the files to be rendered, are forwarded to the imaging device, which then creates a physical document as specified in the job ticket attached to the electronic document.

The Adobe Portable Document Format (PDF) is widely used interchange format for electronic documents in that it is largely platform independent. The PDF format is based on PostScript and can serve as a page description language, describing the graphical appearance of pages with respect to an imaging model. The application generates a device independent description in page description language which can be interpreted by a program controlling a specific output device, which renders the image on the device. A job ticket may be embedded in a PDF file, for example, using Adobe's Portable Job Ticket Format, or appended to it.

A document may include pages of different sizes. When such a document is converted to PDF and processed in a PDF workflow system, the page size information and other formatting information received with the original document is lost as the print software applies its own job ticket. In order to get completely accurate output, the user must set up the print job ticket for the job to reflect the page sizes of the original document, taking into account any changes required if the workflow system has performed any impositions, e.g., signaturizations of the document. This detracts from the usefulness of an automated workflow system, as the print job ticket may have to be set up separately for each document. Setting the various parameters for each job ticket is often a time-consuming task.

INCORPORATION BY REFERENCE

The following references, the disclosures of which are incorporated herein in their entireties by reference, are mentioned:

U.S. Pat. No. 6,271,926, issued Aug. 7, 2001, entitled PRINTING SYSTEM WITH PRINT JOB PROGRAMMING CAPABILITY, by Jacobs, describes a system for creating job tickets via a user interface.

U.S. Pat. No. 6,965,445, issued Nov. 15, 2005, entitled SYSTEMS AND METHODS OF AUTOMATING JOB TICKETING IN PRINTING, COPYING OR IMAGING DEVICES, by Dimperio, et al. discloses systems and methods for creating hard-copy documents without requiring a concurrent creation of an individual job ticket for each document file submitted for document output. The document, or set of documents, are created by submitting document file names which include embedded text strings and/or additional parameters that correspond to preconfigured job tickets saved on a hard drive of an imaging system.

BRIEF DESCRIPTION

In accordance with one aspect of the exemplary embodiment, a method for generation of a print job ticket includes extracting page attribute information from an electronic document, embedding the page attribute information as an object within the document, processing the document to form a print job, automatically reading the object embedded in the processed document to retrieve embedded page attribute information, and generating a job ticket for the print job based on the retrieved embedded page attribute information.

In another embodiment, a workflow system includes a component which extracts page attribute information from an electronic document and embedding the page attribute information as an object within the document, and a component which retrieves the embedded object and creates a job ticket for a print job which comprises the document, based on the page attribute information retrieved from the embedded object.

In another aspect of the exemplary embodiment, a printing system includes a printer. A workflow system in communication with the printer is provided for processing one or more electronic documents to be sent to the printer as a print job. The workflow system executing instructions stored in associated memory for extracting page information from the one or more electronic documents and embedding the page information as an object within the one or more documents and instructions for modifying the object to reflect modifications to the document during the processing. The workflow system automatically creates a job ticket for the print job based on the page information embedded in the object.

DETAILED DESCRIPTION

Figure 1:
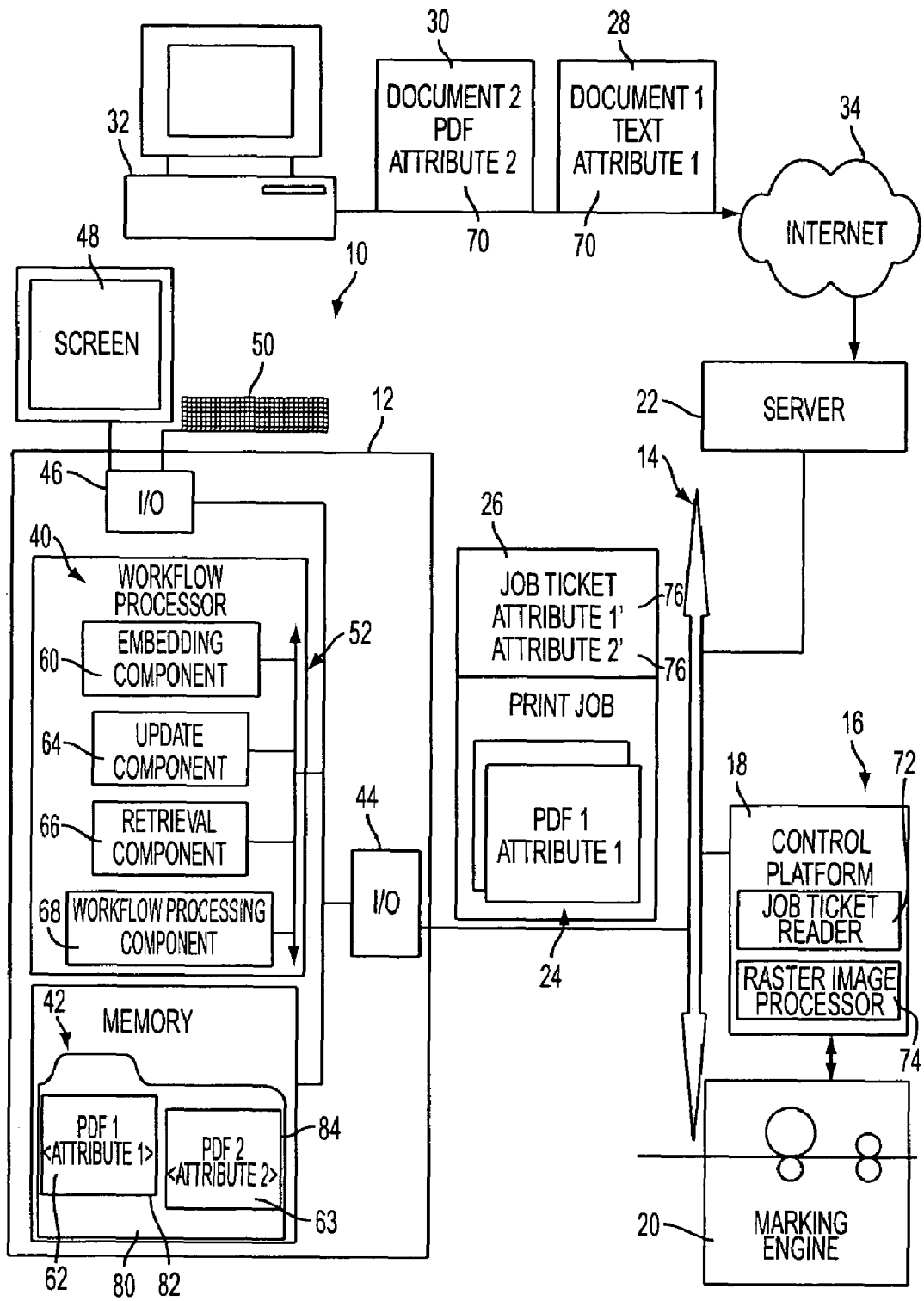
FIG. 1 is a functional block diagram of a printing system in accordance with the exemplary embodiment.

In aspects of the exemplary embodiment described herein a workflow processing system and method for processing electronic documents during preparation of a print job are provided. The system automatically retains information about the page attributes of individual pages of the documents so that the information about the retained attributes can be used in generating a job ticket for the print job. Other features of the document may be retained along with the page attributes.

In accordance with one aspect of the exemplary embodiment, the page attribute information is automatically read from the original document and embedded in the document as an object in a PDF file, the embedded object being subsequently readable for generation of a job ticket in which the page attribute information embedded in the object is incorporated automatically, without the need for user input. Page attribute information may include page size information, page rotation for individual pages, page plex, and page type. The page size may be expressed as A4, letter etc, or in the dimensions of such sheets, such as length and width dimensions, e.g., in mm. Page plex refers to specific assignment of the page to the front or back side of a sheet of the finished document. For example, in a generally 2-sided document, some pages may be marked out to be 1-sided, or to be the start of a chapter, in which case the page may be forced to be on a front page (sometimes called recto side of the sheet as opposed to verso). Page type refers to the stock used. For example, some pages might be marked out to be printed on tab stock, and may even have some text positioned to be printed on the tab, which text would end up off the edge of the sheet if printed on non-tab paper.

A "print job" is generally a device independent description in page description language of each page to be rendered which can be interpreted by a program controlling a specific output device and normally comprises a set of electronic document pages from a particular user, or otherwise related, for which instructions for printing are provided in an associated job ticket.

A job ticket generally includes a set of instructions sent to a printer along with an electronic document to instruct the printer to print a physical document in a specified format and with specified features (e.g., with specific page attributes), and to specify exceptions to that format for specified pages, or additional specified features for those exceptional pages.

"Print media" can be a usually flimsy physical sheet of paper, plastic, or other suitable physical print media substrate for images.

An "image" generally may include information in electronic form which is to be rendered on the print media by the image forming device and may include text, graphics, pictures, and the like. Rendering implies the output of an image in physical or digital form. The operation of applying images to print media, for example, graphics, text, photographs, etc., is generally referred to herein as printing or marking.

With reference to FIG. 1, a functional block diagram of a printing system 10 suitable for performing the methods described herein is shown. The printing system includes one or more workstations 12, which may be linked by a suitable electronic link for conveying data, such as a network 14 to an output device 16. The output device 16 can comprise any device for rendering an image on tangible print media, generally referred to herein as a "printer", such as a copier, laser printer, bookmaking machine, facsimile machine, or a multifunction machine having printing, copying and/or faxing capabilities. In the illustrated embodiment, the output device includes a control platform 18, which processes incoming print jobs and a marking engine 20 which renders the print job on print media, such as paper. Alternatively, the output device 16 can be a device which renders a digital image in electronic form, such as on a screen. The workstation 12 may be a computer system, such as a PC, such as a desktop, a laptop, palmtop computer, portable digital assistant (PDA), cellular telephone, pager, or other computing device capable of communicating a print job to the image rendering device 16 either directly or via a network server 22. The network 14 may be a computer network, such as a local area network (LAN) or wide area network (WAN), or the internet. In general, the workstation 12 operates under the control of an operating system, such as the WINDOWS operating system, and installed software for generation of a print job 24 and an electronically-stored job ticket 26 for the print job.

Documents to be rendered, e.g., printed, such as text or PDF files 28, 30, may be generated on the workstation 12 or may arrive at the work station 12 via the network 14. In the illustrated embodiment, which is suited to use in print shops, the native documents 28, 30 may arrive from a remote source 32, via an external network, such as the Internet 34, and be routed to the workstation 12 by the server 22. The remote source 32 may be a workstation, such as a PC, a server, a router, a network PC, a peer device or other common network node, and typically includes many or all of the elements described above relative to the workstation 12.

The illustrated workstation 12 includes a workflow processing system 40 for processing documents to form a print job. The workflow processing system may be a component of the overall computer operating system or may be a software plug-in component. The workflow processing system 40 executes instructions for processing the documents 28, 30 in accordance with user inputs. During processing, the documents may be stored in memory 42 connected to or otherwise associated with the processing system 40. The workstation 12 also includes one or more interfaces for communicating with other devices, such as a network input output (I/O) interface 44 and a user I/O interface 46. The network I/O interface 44 allows the computer system to communicate with data source 32, the image rendering device 16, and optionally other workstations, via the network 14. The I/O interface 46 may communicate with one or more of a display 48, for displaying information to users, speakers, and a user input device 50, such as a keyboard or touch or writable screen, for inputting text, and/or a cursor control device, such as mouse, trackball, or the like, for communicating user input information and command selections to the processing system. The various components 40, 42, 44, 46, etc. of the computer system 12 may be all connected by a bus 52. The exemplary workflow processing system 40 executes instructions for performing the method outlined in FIG. 2 and described in greater detail below.

The memory 42 may represent any type of computer readable medium such as random access memory (RAM), read only memory (ROM), magnetic disk or tape, optical disk, flash memory, or holographic memory and combinations and multiples thereof. In one embodiment, the memory 42 comprises a combination of random access memory and read only memory. Memory 42 may further include volatile memory for storing documents received from source 32 and modifications to the documents as they are prepared for printing.

As will be appreciated, FIG. 1 is a high level functional block diagram of only a portion of the components which are incorporated into a computer system. Since the configuration and operation of programmable computers are well known, they will not be described further.

The screen 48 and user input device(s) 50 form a graphical user interface through which a user can select one or more documents for rendering as a print job 24 and create a job ticket 26 to accompany the documents to the output device 16. Alternatively, the processing system 40 may execute instructions for automatically generating a print job based on the documents submitted from the source 32. The job ticket 26 specifies printing instructions including a desired set of page attributes, such as paper size, simplex (single sided) or duplex (two-sided) printing, reductions/enlargements, image rotations, and the like for each page of the print job 24.

As illustrated in FIG. 1, the workflow processing system 40 may comprise a plurality of workflow system software components including an embedding component 60, which recognizes job ticket information associated with a document 28, 30 and embeds the information in the document as a temporary job ticket 62, 63, an update component 64, which modifies the temporary job ticket in accordance with any workflow system processing of the document, such as imposition/, e.g., signaturization, and the like, and a retrieval component 66, which retrieves the temporary job ticket and generates a job ticket 26 for the print job document containing it, and one or more workflow processing components 68 for conventional workflow processing of the documents. Although the processing system 40 may comprise three components as described, it is to be appreciated that the functions of the modules may be combined into a single processing component or may be split among processing components.

The component 60 automatically extracts page attribute information 70 from a document and uses a rule-based algorithm to convert it into the temporary job ticket 62, 63 which is then embedded in the document. In particular, the component 60 executes instructions for automatically generating the temporary job ticket 62, 63 based on the page attribute information associated with the incoming document 28, 30. The component 60 also executes instructions for embedding the temporary job ticket 62, 63 into the document. The temporary job ticket 62, 63 which is embedded as an object in the document may be encoded in a format which is readable by the update and retrieval components 64, 66, but is generally not recognized by the printer 16 or other output device, i.e., it need not be in a platform independent format. In general, the output device 16 ignores the object 62, 63 during rendering the print job, relying on the print job ticket 26 for providing the instructions for printing the document. For example, the output device may include a job ticket reader 72 which reads the job ticket 26 and a raster image processor 74 which converts the print job 24 into an output format in accordance with the instructions 76 in the job ticket 26 read by the reader 72.

For example, the job ticket information may be encoded, such as an XML tag 62, 63, and embedded as an object in a respective PDF document 82, 84. Where the incoming document 28, 30 is a PDF file, the page attribute information may include page size information which may be extracted from each page in the PDF file. The paper size information is encoded in the XML temporary job ticket 62, 63, and the temporary job ticket is embedded in the PDF file itself. The temporary job ticket 62, 63 can be extracted, modified, and re-embedded by interested workflow processes, such as imposition processes, and finally extracted and used in forming a job ticket 26 for printing the overall print job.

The update component 64 comprises software instructions to read such an embedded job ticket 62, 63 and update the job ticket. In particular, the update component 64 may transform its page sizes and other page attributes using a rule-based algorithm in accordance with the type of imposition being performed. The retrieval component 66 includes software to read such an embedded job ticket 62, 63 and use it as the print job ticket 26 for the document that contains it.

Figure 2:
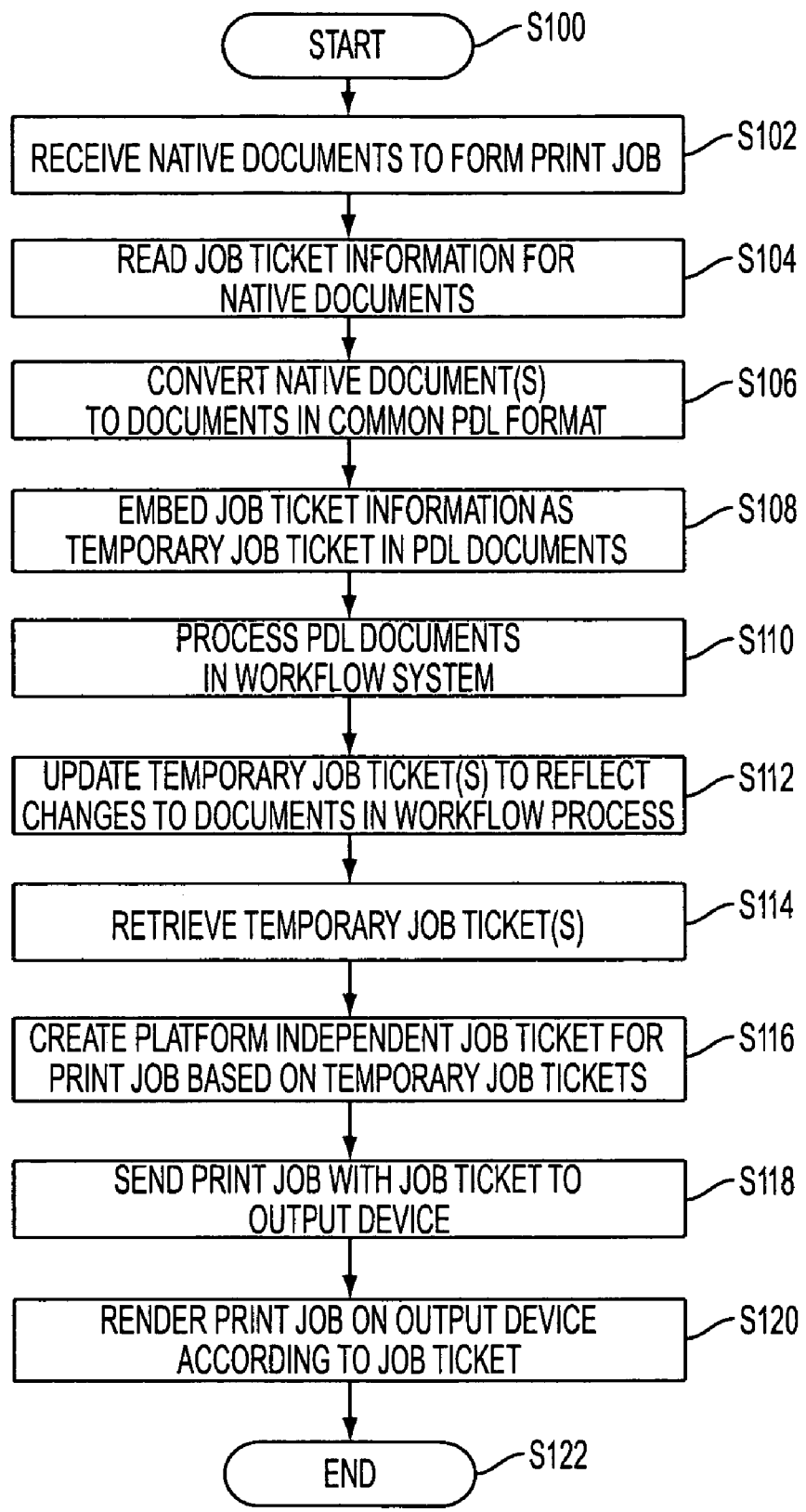
FIG. 2 is an exemplary flow diagram illustrating an exemplary method of processing documents in a workflow system.

With reference now to FIG. 2, a method for processing documents in forming a print job is illustrated. As will be appreciated, the method may include fewer, more or different steps to those illustrated and the steps need not all be performed in the order shown. The method begins at step S100. At step S102, one or more native documents 28, 30 to be consolidated as a print job are received by the workstation 12. A graphical user interface, such as supported by MICROSOFT WINDOWS 2000™ may be used for generating standardized "screens" and/or templates to interactively manage and/or operate the workflow system. As will be appreciated, not all documents 28, 30 may be pulled into the workflow system at the same time.

The native documents 28, 30 may be in the same or different formats, such as text documents, e.g., Microsoft Word, spreadsheets, such as Excel, image files, such as PDF or JPEG, tagged image file format (TIFF) documents, Power Point documents, or the like. The documents to constitute the print job 24 may be placed in a folder 80 in temporary memory. A unique identifier may be established for the print job, to uniquely identify the print job, and documents associated with it, during workflow processing. For example, the unique ID may be an alphanumeric code, such as "Job 1," or other similar code.

At step S104, job ticket information 70 associated with each native document 28, 30 is read by embedding component 60. Depending on the type of document, the job ticket information 70 may be associated with the document as a file header, be embedded in the document, or otherwise associated with the document. The job ticket information may include formatting instructions, such as page size, rotation, as well as job name information (title, author), and the like.

At step S106, documents which are not already in a page description language (PDL) format are converted to a PDL format, such as PDF, PostScript, PCL-5, PCL-5E, PCL-6, PCL-XL, or the like. The page description language is generally an open format which is compatible with the output device 16 selected for outputting the print job, e.g., the printer 16. Typically, all of the native documents 28, 30 are converted to the same PDL format, such as PDF files 82, 84.

At step S108 the job ticket information 70 from each native document is embedded in the corresponding PDL document 82, 84 by the embedding component 60. In the illustrated embodiment, the job ticket information is embedded as an XML object 62, 63. The embedded object 62, 63 may include an identifier which identifies the object as a temporary job ticket. The unique identifier for the print job may also be embedded in the documents 82, 84 in the folder.

At step S110 the documents 82, 84 to constitute the print job may undergo formatting in a workflow by one or more workflow processing components 68. Exemplary workflow processes include preflight, color management, watermarking, imposition, and the like. The preflight processing is a compliance analysis step that compares the document to a set of rules, such as formatting rules, printability rules, and the like, relating to the specific output device used for creating the document in its final physical or electronic form. The preflight process verifies that a document has the necessary elements and formats to perform as desired in the workflow so that problems can be identified prior to a final output step (such as printing, posting on a website, incorporating it into a CD-Rom, etc.). In this stage, for example, fonts may be checked to confirm that they are compatible with the fonts recognized by the selected output device 16.

Color management processing may include correcting the color balance of documents, conversion from one color space to another (e.g. from RGB to CMYK), and the like.

Imposition may involve the printing of pages on a single sheet of paper in a particular order so that they come out in the correct sequence when cut and folded. Signaturization is a form of imposition used to make books, and typically involves putting two images on each side of a sheet, and reordering the pages so that when the sheets are folded and stitched together, the pages end up in the correct order. Imposition may thus involve laying out the document(s) in the same format as the finished pages of a book on the paper on which they will be printed. Imposition can be as simple as placing two documents side by side to form left and right pages of a book, taking into account that multiple sheets may be bound together. Where the printed sheets include more pages, such as sixteen pages per sheet, impositions may incorporate various orientations to accommodate both folding and cutting the printed sheets as well as other factors, such as the final trim size of the book, the size of the paper upon which the book will be printed, the binder utilized, and other processes, such as page numbering, watermarking, and the like. Another form of imposition includes assigning multiple copies of the same page to a single sheet, such as "four-up", in which a page image is shrunk so that four identical copies of it are printed on each sheet of paper.

At each of these changes, modifications to the document which affect the job ticket information 62, 63 are recognized by the update component 64. The update component updates the information in the temporary job ticket 62, 63 to reflect the modifications to the document 82, 84 (step S112). For example, document pages may be resized (e.g., reduced, enlarged, or cropped) from their original size. In order to retain the correct aspect ratio of an image on the page, the update component 64 may retrieve the original document size information from the job ticket, modify the document size information to retain the original aspect ratio in the resizing and re-embed the new information in the temporary job ticket 62, 63. The original page size instructions may also be retained in the temporary job ticket so that the stock used in printing the document pages is the same size as specified in the original page attribute information 70. The temporary job ticket 62, 63 may undergo any number of such modifications during the workflow processes. The result of the workflow processes may be a single document, such as a PDF document 24, which includes the modified documents 82, 84 as objects.

Once the workflow processes are complete, the retrieval component 66 retrieves the temporary job tickets 62, 63 from the processed documents (step S114). This step may include searching for XML objects with the temporary job ticket identifier.

At step S116, a job ticket 26 for the entire print job is created using the information stored in the temporary job tickets 62, 63. The job ticket 26 may be created in a platform independent format, such as Adobe's Portable Job Ticket Format (PJTF) or CIP4's Job Definition Format (JDF), in which extensible markup language (XML) is utilized as a language for structuring the job ticket 26. The platform independent job ticket 26 may be embedded in the PDF file 24 or provided as a separate job ticket. The print job 24, along with its platform independent job ticket 26, is then sent to the output device 16 for rendering (step S118). At step S120, the output device reads the job ticket 26 and renders the print job 24 in accordance with the instructions in the job ticket. The method ends at step S122.

A document 28, 30 submitted to a workflow system may contain, depending on the document format, various kinds of job ticketing information, including the specification of varying page sizes for individual pages in the document. When such a document is processed in the exemplary workflow system 40, the page size information embedded in the original document is retained in the document in a format in which it can later be extracted and carried over into the job ticket 26 sent to the printer. Thus, page information which is typically lost during printing, or which is reentered manually by an operator is made automatically available. The exemplary system allows a more accurate output of the document, since it avoids the operator having to set up the job ticket 26 for the job to reflect the page sizes of the original document, which may introduce errors if the information is incorrectly entered.

The exemplary system is also able to take into account any transformations of the page sizes required if the workflow system performs impositions of the document, which is difficult to perform manually.

In one aspect of the exemplary embodiment, the method illustrated in FIG. 2 may be implemented in a computer program product that may be executed on a computer. The computer program product may be a tangible computer-readable recording medium on which a control program is recorded, or may be a transmittable carrier wave in which the control program is embodied as a data signal, or a combination thereof.

Figure 3:
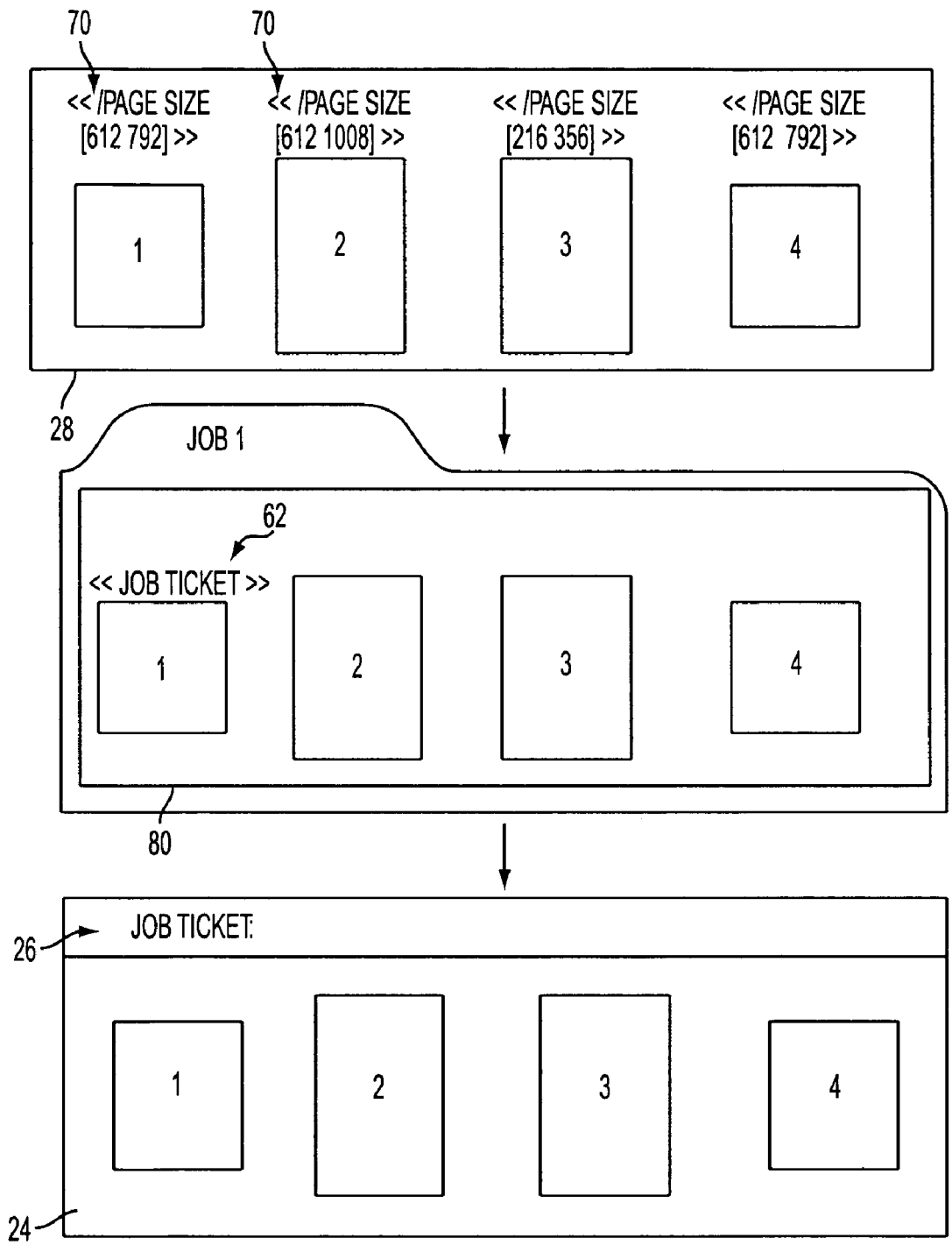
FIG. 3 illustrates exemplary documents during workflow processing.

FIG. 3 illustrates by way of example, a simplified scenario in which an incoming document is a four-page PDF file whose first and fourth pages are letter-sized and whose second and third-pages are legal-sized would initially have its page sizes represented as <</PageSize [612 1008]>> and <</PageSize [612 792]>> respectively. The workflow system page attribute embedding component 60 extracts these page attributes and other job-ticket-related information, such as job name for the document, from the incoming document. The information is then converted to XML job ticket data similar to that below:

```
...
<stock-list syntax="collection">
    <stock-0 syntax="collection">
        <width syntax="integer">216</width>
        <length syntax="integer">279</length>
    </stock-0>
    <stock-1 syntax="collection">
        <width syntax="integer">216</width>
        <length syntax="integer">356</length>
    </stock-1>
    ...
</stock-list>
...
<exception-page-list syntax="collection">
    <exception-0 syntax="collection">
        <start syntax="integer">1</start>
        <end syntax="integer">1</end>
        <media syntax="integer">1</media>
        <customRotation syntax="integer">0</customRotation>
    </exception-0>
    <exception-1 syntax="collection">
        <start syntax="integer">4</start>
        <end syntax="integer">4</end>
        <media syntax="integer">1</media>
        <customRotation syntax="integer">0</customRotation>
    </exception-1>
</exception-page-list>
...
```

This XML temporary job ticket 62 can then be embedded in the PDF document using the standard method for embedding file streams in PDF documents (see, for example, Adobe PDF Spec. 3.10.3). If the PDF document is subsequently processed by a workflow component that performs a two-up imposition, for example, the XML job ticket data embedded in the PDF may be changed (depending on the rules applied) to:

```
<stock-list syntax="collection">
    <stock-0 syntax="collection">
        <width syntax="integer">432</width>
        <length syntax="integer">279</length>
    </stock-0>
    <stock-1 syntax="collection">
        <width syntax="integer">432</width>
```

```
        <length syntax="integer">356</length>
      </stock-1>
      ...
    </stock-list>
    ...
    <exception-page-list syntax="collection">
      <exception-0 syntax="collection">
        <start syntax="integer">1</start>
        <end syntax="integer">1</end>
        <media syntax="integer">1</media>
        <customRotation syntax="integer">0</customRotation>
      </exception-0>
      <exception-1 syntax="collection">
        <start syntax="integer">4</start>
        <end syntax="integer">4</end>
        <media syntax="integer">1</media>
        <customRotation syntax="integer">0</customRotation>
      </exception-1>
    </exception-page-list>
    ...
```

The XML temporary job ticket 62 can be extracted by the retrieval component 66 of the workflow system, and used to print the PDF document.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for generation of a print job ticket comprising: extracting page attribute information from a first electronic document;
embedding the page attribute information as an object within the first electronic document; extracting page attribute information from a second electronic document; embedding the page attribute information as an object within the second electronic document; processing the first and second electronic documents to form a print job; automatically reading the objects embedded in the processed documents to retrieve embedded page attribute information; and
generating a job ticket for the print job based on the retrieved embedded page attribute information of the first and second electronic documents, including automatically assigning a first page attribute to at least a first page of the print job which includes information from the first document based on the object embedded in the first document and assigning a second page attribute to at least a second page of the print job which includes information from the second document based on the object embedded in the second document.

2. The method of claim 1, wherein the embedding includes embedding the object in at least one of the documents when the at least one document is in an interchange format which is compatible with an image rendering device on which the print job is to be rendered.

3. The method of claim 2, wherein the interchange format comprises a Portable Document Format (PDF).

4. The method of claim 1, further comprising, prior to embedding, converting at least one of the documents to an interchange format which is compatible with an image rendering device on which the print job is to be rendered.

5. The method of claim 1, wherein for at least one of the documents, the embedding of the page attribute information as an object includes embedding an XML tag in the document.

6. The method of claim 1, wherein the processing of at least one of the documents to form the print job comprises an imposition process.

7. The method of claim 1, wherein the processing of at least one of the documents includes automatically modifying the embedded object to reflect changes made to the document during the processing.

8. The method of claim 1, wherein the object embedded in the first document includes a first page attribute and the object embedded in the second document includes a second page attribute which is different from the first page attribute and wherein the objects embedded in the first and second documents are different.

9. The method of claim 1, wherein the page attribute information includes information about a page attribute selected from page size, duplex/simplex printing, rotation of the document, page plex, and page type, and combinations thereof.

10. The method of claim 9, wherein the page attribute information includes page size information and wherein the processing of at least one of the documents includes imposition which modifies the page size of the document and wherein the method includes modifying the embedded object of the at least one of the documents to reflect the modified page size of the document.

11. A tangible computer program product which stores instructions which when executed by a computer, performs the method of claim 1.

12. A workflow system comprising:
a component which, for each of a plurality of electronic documents, extracts page attribute information from the electronic document and embeds the page attribute information as an object within the document; and
a component which retrieves the embedded objects and creates a job ticket for a print job which comprises the plurality of documents, the job ticket being based on the page attribute information retrieved from the embedded objects, the job ticket assigning a first page attribute to at least a first page of the print job which includes information from the first document based on the object embedded in the first document and assigning a second page attribute to at least a second page of the print job which includes information from the second document based on the object embedded in the second document.

13. The workflow system of claim 12, further comprising a component for updating the embedded object of at least one of the plurality of documents to reflect changes to the at least one of the plurality of documents following the embedding of the object.

14. The workflow system of claim 13, wherein the component for updating the object modifies information in the object relating to at least one of a page size, rotation of a page, imposition of pages.

15. A document processing system comprising the workflow system of claim 12 and an output device in communication with the processing system which reads the job ticket and outputs the print job in accordance with the job ticket.

16. The system of claim 15, wherein the output device comprises a printer which renders the print job on tangible media.

17. The system of claim 15, further comprising a graphical user interface in communication with the processing system whereby a user modifies at least one of the plurality of documents, the workflow system incorporating changes to the page attributes of the modified document in the embedded object.

18. A printing system comprising: a printer; and a workflow system in communication with the printer for processing one or more electronic documents to be sent to the printer as a print job, the workflow system executing instructions stored in associated memory for extracting page information from the one or more electronic documents and embedding the page information as an object within the one or more documents and instructions for modifying the object to reflect modifications to the document during the processing, the workflow system automatically creating a job ticket for the print job based on the page information embedded in the object, wherein when the one or more electronic documents comprises first and second documents, the job ticket for the print job based on the retrieved embedded page information includes a first page attribute assigned to at least a first page of the print job which includes information from the first document based on the object embedded in the first document and a second page attribute assigned to at least a second page of the print job which includes information from the second document based on the object embedded in the second document.

* * * * *